June 10, 1930. C. YUCIUS 1,763,118
SUGAR DISPENSING APPARATUS
Filed May 14, 1928   3 Sheets-Sheet 1
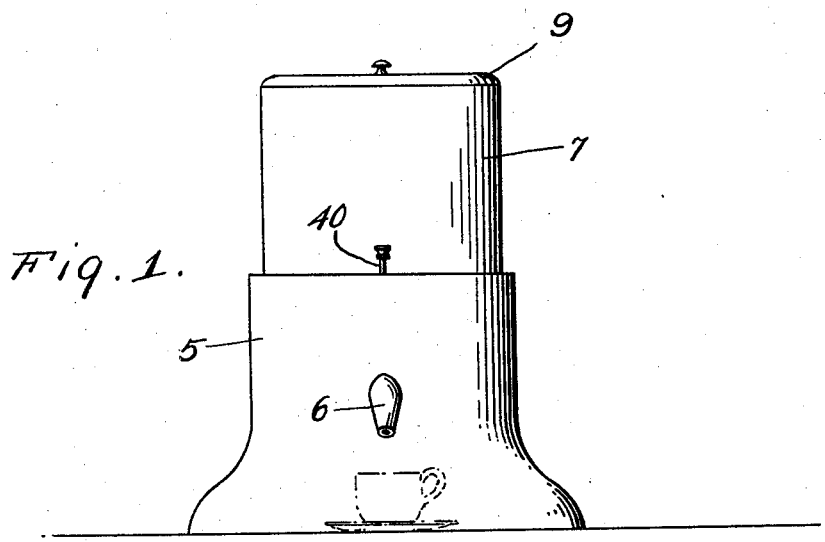
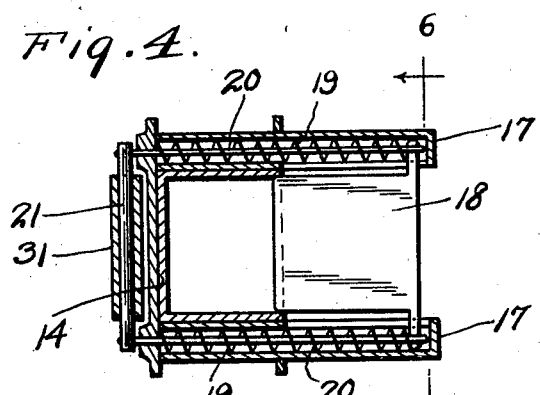
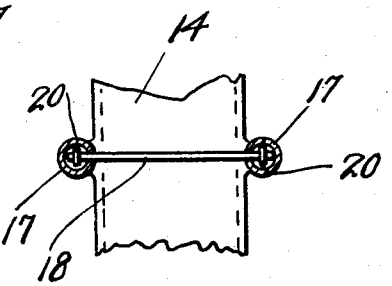
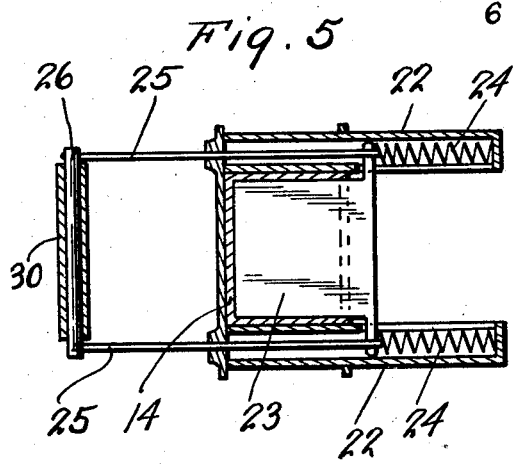
Inventor
Casimir Yucius
By Clarence A. O'Brien
Attorney

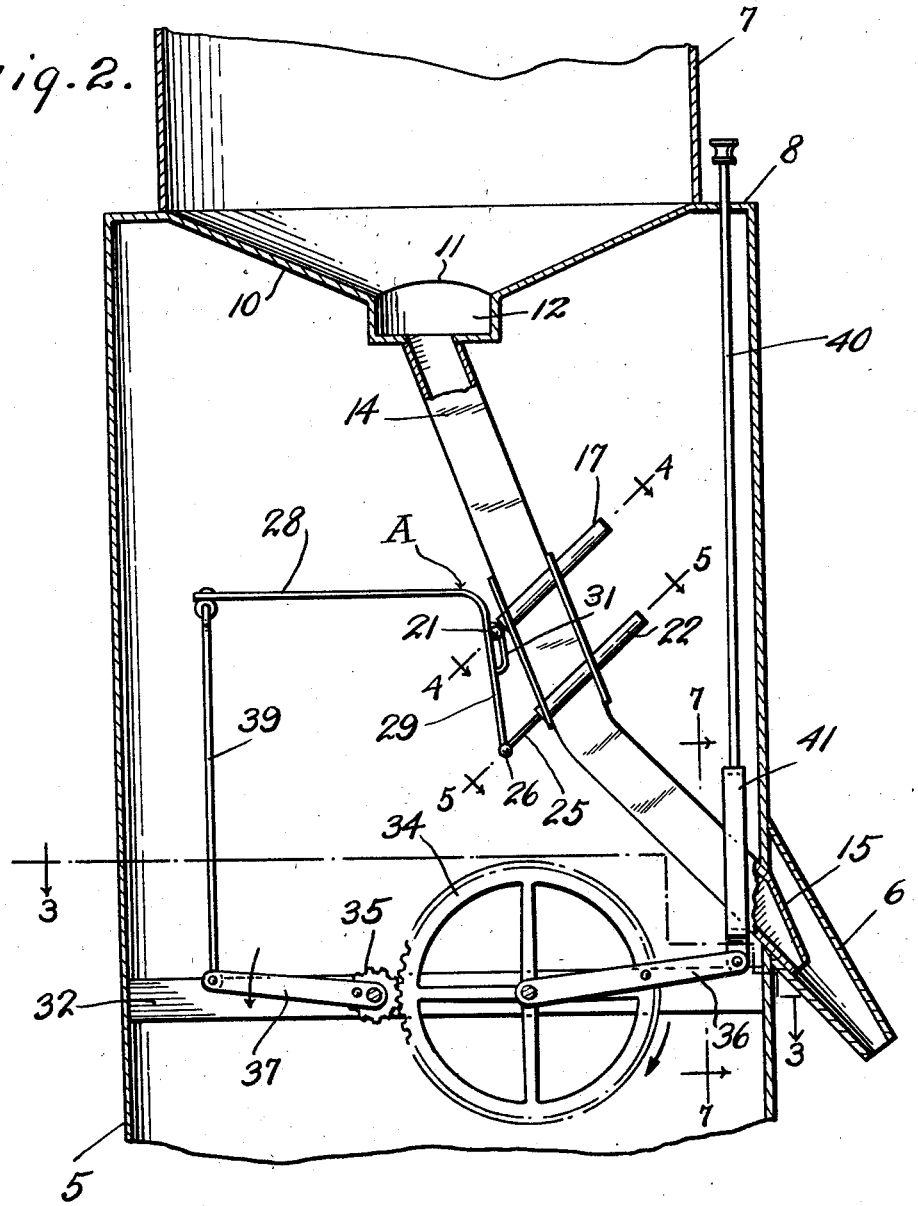

June 10, 1930.  C. YUCIUS  1,763,118
SUGAR DISPENSING APPARATUS
Filed May 14, 1928   3 Sheets-Sheet 3
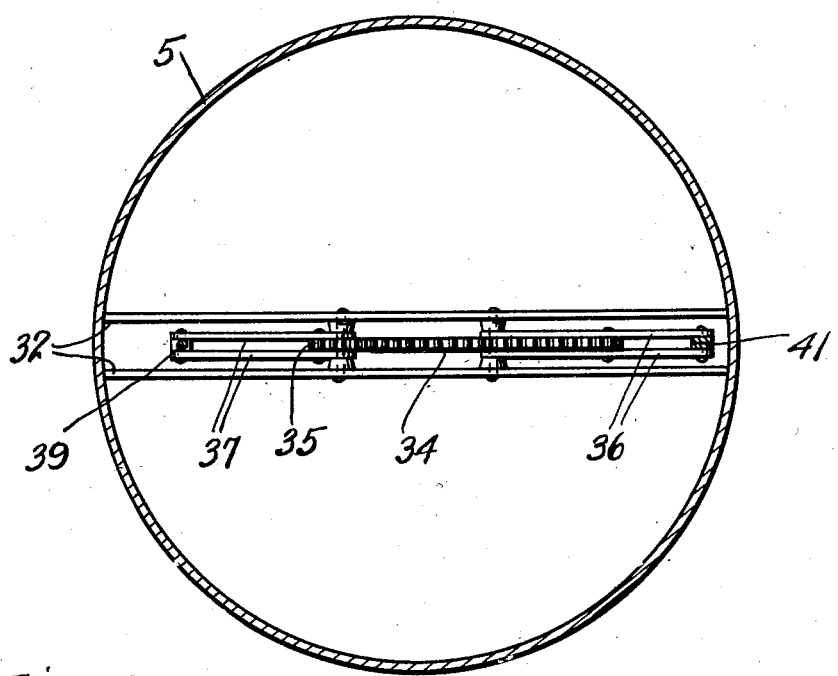
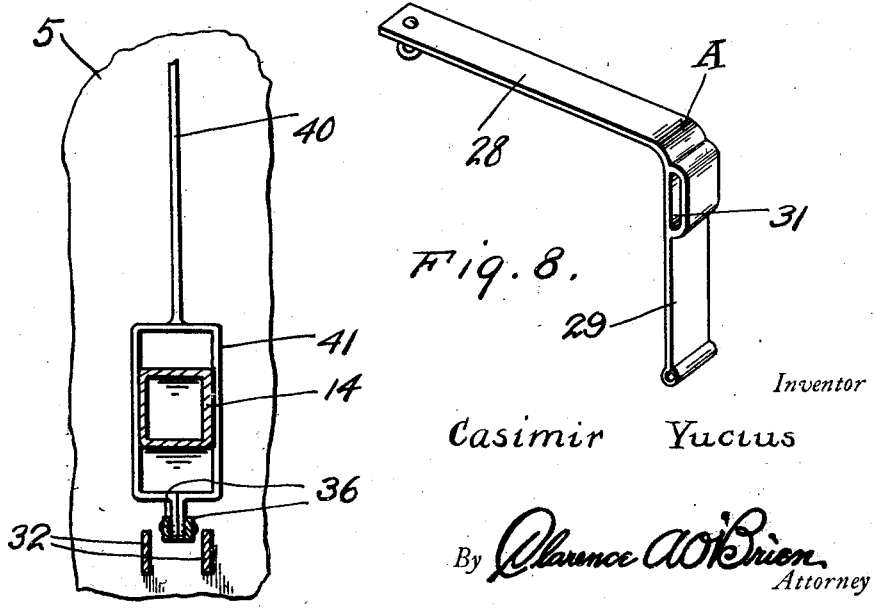
Inventor
Casimir Yucius
By Clarence A. O'Brien
Attorney Patented June 10, 1930

1,763,118

UNITED STATES PATENT OFFICE

CASIMIR YUCIUS, OF CHICAGO, ILLINOIS

SUGAR-DISPENSING APPARATUS

Application filed May 14, 1928. Serial No. 277,684.

The present invention relates to an apparatus for dispensing sugar and the like and has for its prime object to provide an apparatus which on each operation will dispense a predetermined amount of sugar or the like.

Another very important object of the invention resides in the provision of an apparatus of this nature which is exceedingly sanitary and economical in use.

A still further very important object of the invention resides in the provision of an apparatus of this nature which is simple in its construction, inexpensive to manufacture, strong and durable, compact and convenient in its arrangement of parts, easy to manipulate, thoroughly efficient and reliable in operation, not likely to easily become out of order, and otherwise well adapted for the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is an elevation of an apparatus embodying the features of my invention, Figure 2 is an enlarged fragmentary vertical section therethrough, Figure 3 is a horizontal section taken substantially on the line 3—3 of Figure 2, Figure 4 is a detail section taken substantially on the line 4—4 of Figure 2, Figure 5 is a detail section taken substantially on the line 5—5 of Figure 2, Figure 6 is a detail section taken substantially on the line 6—6 of Figure 4, Figure 7 is a detail section taken substantially on the line 7—7 of Figure 2, and Figure 8 is a perspective view of a lever.

Referring to the drawings in detail it will be seen that the numeral 5 denotes a casing of suitable formation having one or more spouts 6 inclining outwardly and downwardly therefrom through which is adapted to be fed sugar or the like.

A container 7 rises from the casing and is smaller in diameter than the casing so as to provide a ledge 8. A removable cover 9 is provided for the container 7. The container 7 functions as a hopper for the sugar or the like and has an inwardly and downwardly inclined bottom 10 with a central opening 11 from which extends downwardly a hopper 12 from which leads a chute 14 terminating in a restricted end 15 inside the upper portion of the spout 6.

For the purpose of clearness and simplicity I am describing the construction incidental to one side only but, of course, any number may be provided by the mechanism about to be described. A slideway guide structure 17 is disposed on and across the chute 14 and has slidable therein a valve plate 18 normally held open by springs 19 in the guideways and about rods 20 connected by a cross pin 21.

Similar slideway guide structure 22 is disposed on and across the chute 14 below the structure 17 and a distance therefrom and has slidable therein a valve plate 23 normally held closed by springs 24 and operable through rods 25 connected together by cross pins 26. An L-shaped lever A includes angularly disposed arms 28 and 29. The extremity of the arm 29 has a sleeve formed thereon as indicated at 30 rockably receiving the pins 26 and intermediate its ends provided with a loop 31 of elongated construction slidably receiving the pin 21.

A pair of spaced parallel frame bars 32 are mounted in the lower portion of the casing 5 transversely thereof and have journaled therein a relatively large gear 34 and a relatively small gear 35 which mesh with each other.

A crank 36 is fixed to the gear 34 and a crank 37 is fixed to the gear 35. The crank 37 is connected with the extremity of the arm 28 by means of a link 39. A push rod 40 is slidable through the ledge 8 down in position and merges into a rectangular frame 41 folded about the lower portion 14 and is connected with the extremity of the crank 36.

When the rod 40 is pushed downwardly, the gears 34 and 35 are caused to rotate so that the link 39 pulls downwardly on the arm 28 of the lever A and this lever rocks on the pin 26 first until the plate 18 is closed across the chute portion and then the lever rocks on the pin 21 and pushes the plate 23 to an open position and a predetermined quantity of sugar is thereby released to gravitate through the chute and through the spout 6 into a cup of coffee or the like.

It is thought that the construction, operation, and advantages of the invention will now be quite apparent since as soon as the rod 40 is released springs 19 and 24 will return the parts to their normal position.

The present embodiment of the invention has been disclosed in detail merely for the purpose of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. A dispensing apparatus of the class described comprising a casing, a container rising from the casing, a chute extending downwardly from the container through the casing, a spout extending from the casing and receiving the lower end of the chute, a pair of valve plates slidable across the chute one above the other, means normally holding the lower valve plate closed, a push rod, and means actuatable by said push rod to first close the upper plate and then open the lower plate, said last mentioned means comprising a lever, means rockably engaging an end of the lever with the lower plate, means slidably and rockably engaging the lever with the upper plate, and means for rocking the lever when the rod is pushed.

2. A dispensing apparatus of the class described comprising a casing, a container rising from the casing, a chute extending downwardly from the container through the casing, a spout extending from the casing and receiving the lower end of the chute, a pair of valve plates slidable across the chute one above the other, means normally holding the lower valve plate closed, a push rod, and means actuatable by said push rod to first close the upper plate and then open the lower plate, said last mentioned means comprising a lever, means rockably engaging an end of the lever with the lower plate, means slidably and rockably engaging the lever with the upper plate, a link connected with the lever, a pair of gears in mesh with each other, means for journalling the gears inside the casing, means for operating one of the gears from the push rod, a crank on the other gear, and a link between the crank and the lever.

3. In a dispensing apparatus of the class described, a chute, a plate slidable across the chute, means normally holding said plate open, a second plate slidable across the chute below the first mentioned plate, means normally holding said second plate closed, rods extending from said plates, cross pins connecting the rods, a lever having a sleeve rockably receiving the pin of the lower plate and a loop receiving the pin of the upper plate, and means for rocking the lever so that the first plate will be closed and then the second plate will be opened.

In testimony whereof I affix my signature.

CASIMIR YUCIUS.